UNITED STATES PATENT OFFICE.

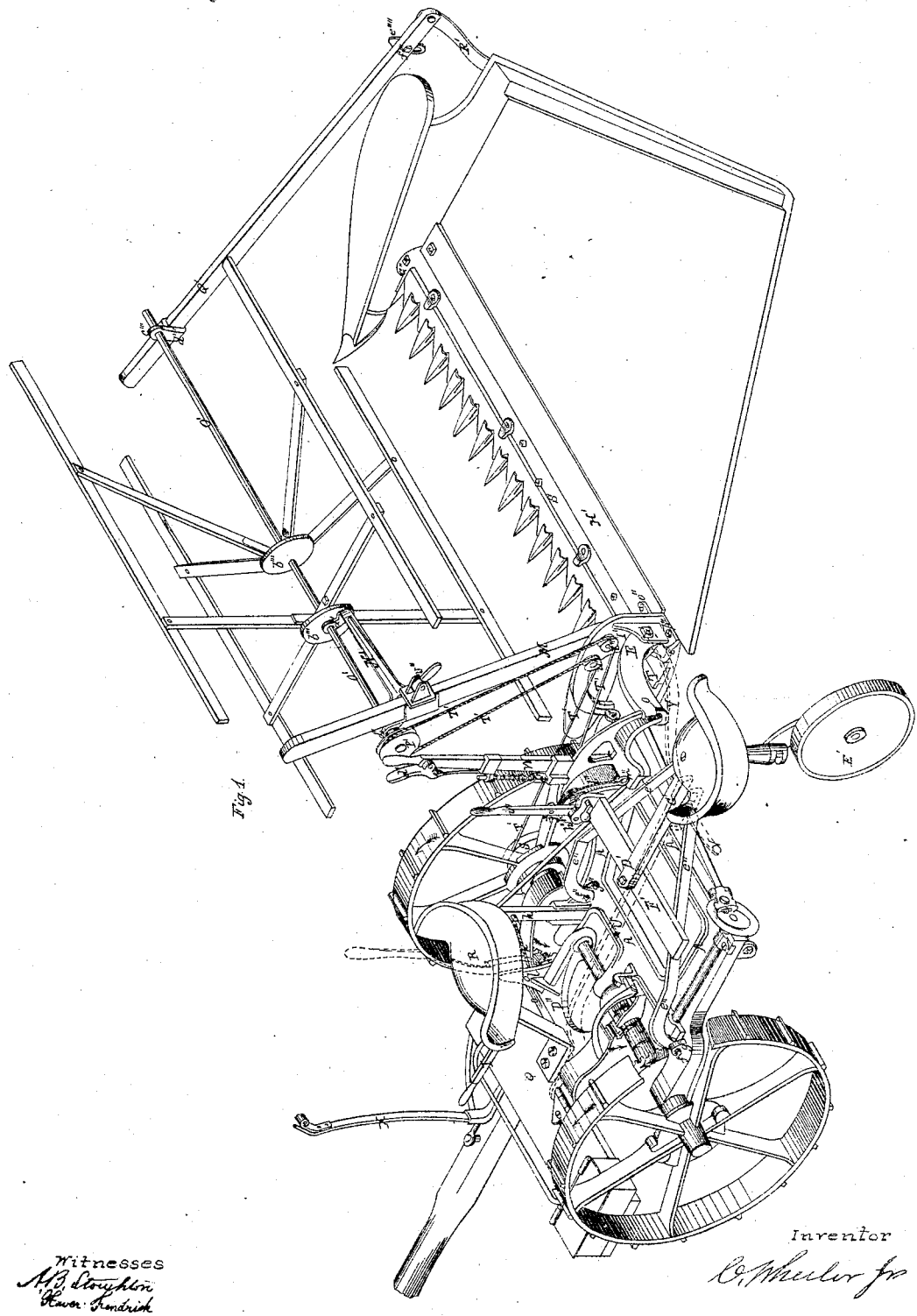

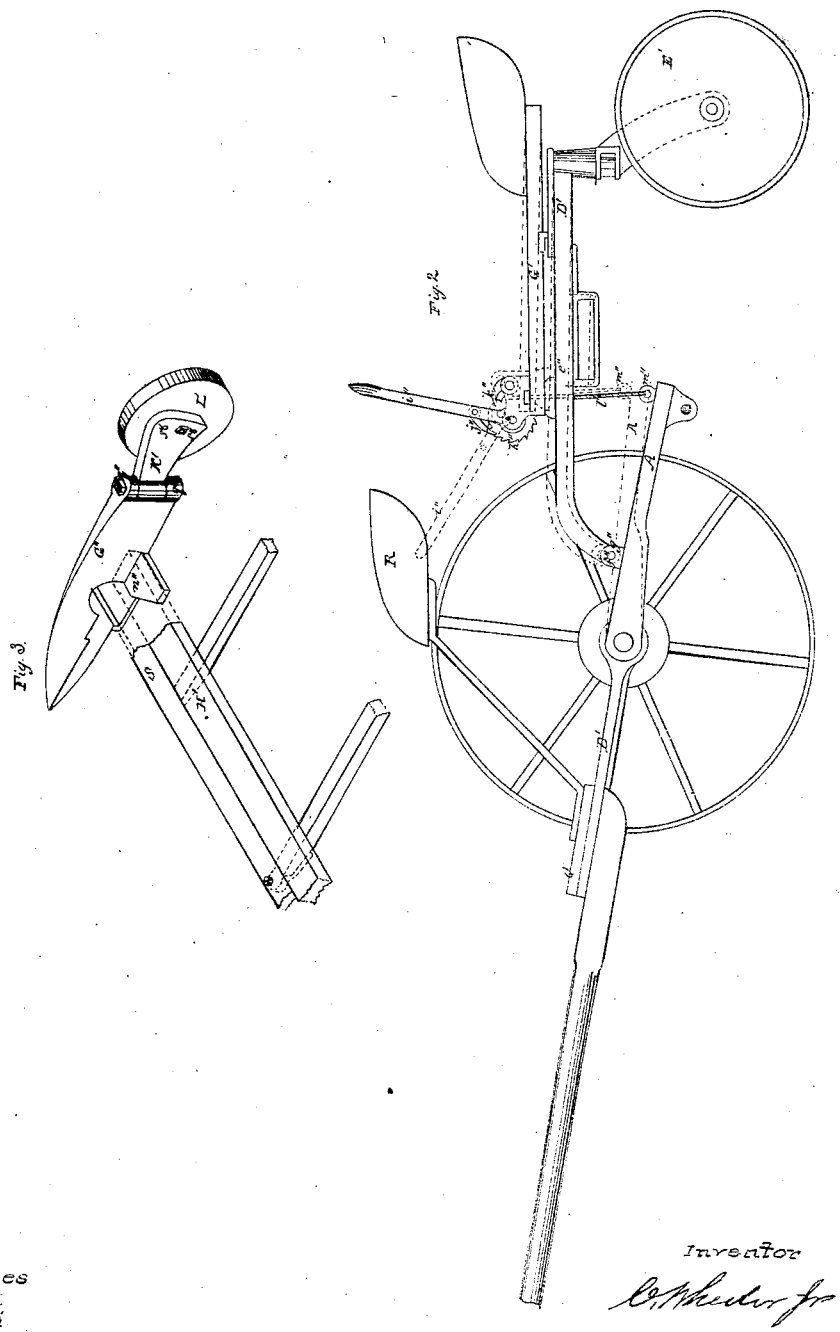
C. Wheeler Jr.
Mower.
Nº 41557 — Patented Feb. 9, 1864.

CYRENUS WHEELER, JR., OF POPLAR RIDGE, NEW YORK.

IMPROVEMENT IN HARVESTING-MACHINES.

Specification forming part of Letters Patent No. 41,557, dated February 9, 1864.

*To all whom it may concern:*

Be it known that I, CYRENUS WHEELER, Jr., of Poplar Ridge, in the county of Cayuga and State of New York, have invented certain new and useful Improvements in Harvesting-Machines; and I do hereby declare that the following is a full, clear, and exact description thereof, reference being had to the accompanying drawings, making a part of this specification, in which—

Figure 1 represents in perspective the machine fitted up for cutting grain. Fig. 2 represents a sectional elevation thereof. Fig. 3 represents on an enlarged scale, in detached view, the outside shoe or divider and a portion of the finger and platform bars.

Similar letters of reference, where they occur in the separate figures, denote like parts of the machine in all the drawings.

This invention consists, first, in the combination of a lever with the cutting apparatus, and with a triangular frame connected with the main frame to carry the driver or operator, so that he can, by operating one lever, elevate the cutting apparatus from the ground at pleasure.

It further consists in the arrangement of the several devices for raising the cutting apparatus, so as to permit its being folded to the machine when the reel and platform are removed, but without detaching any of its other parts.

It further consists in the arrangement of two seats, one in advance and the other in the rear of the main axle with lifting devices, so arranged in relation to each other and the cutting apparatus that the operator can, when occupying either seat, raise the cutting apparatus at pleasure.

It further consists in so connecting to the main frame a second frame for carrying the operator and lifting devices that it may be readily detached therefrom without interfering with the effectiveness of the machine as a mower.

To enable others skilled in the art to make and use my invention, I will proceed to describe the same with reference to the drawings, premising that as the frame-work, gearing, and organism of the machine under one of its conditions as a mower has been fully described in another application for a patent by me of the same date as this and marked "A", and as the present machine is fully shown in the drawings herewith submitted I do not deem it necessary to describe or refer to those parts further than may become necessary to a full explanation of the improvements embraced in this application.

For supporting a seat and a lifting device the frame $D'$ is provided, constructed with side pieces, $e''$, united at two of their ends and mounted on a castor-wheel, $E'$. The other ends of the side pieces are spread apart, so as to form nearly a triangle, and have holes through their ends for uniting it by pivot-bolts $f''$ to ears $g''$ on the main frame A, the pivot-bolts being secured by a pin or leather inserted in holes for the purpose. This triangular frame $D'$ has a cross-bar, $F'$, to the overhanging end of which is pivoted a chain-wheel, $h''$, having a lever, $i''$, on the same pivot with the wheel. This lever carries a catch, $j''$, pivoted to it, which takes into notches in the periphery of the chain-wheel $h''$.

To fasten the chain-wheel in any fixed position a weighted dog, $k''$, is provided and pivoted so as to take into notches in the periphery of the chain-wheel $h''$. To this chain-wheel $h''$ is fastened a chain, $l''$, having a hook at its other end for hooking into the eye $m''$ on the main frame A. To the cross-bar $F'$ is pivoted the lever $G'$, carrying a seat for the raker.

To raise the outer end of the cutting apparatus a transverse lever, V, is provided and pivoted at one end to the hinge-piece E and shoe T by the rear pivot-bolt, $a'$. The lever is curved upward, and passes at its opposite end through a long loop on the under side of the triangular frame $D'$. On the inside of the shoe T, directly under the lever V, is a rib, $c'$, which strikes against the lever V when the inner end of the cutting apparatus is raised, and causes the outer end of the cutting apparatus to raise also. When the cutting apparatus is thus elevated the operator can turn the outer end of the cutting apparatus up to a perpendicular position. Then, by raising the bolt $e'$ from the notches in the quadrant by means of the thumb-lever $d'$, the cutting apparatus will, if divested of the reel and platform, turn down outside of the driving-wheel, and the graduating-lever W inside of the wheel, where it can be secured in its position by slipping the loop of the track-board over the point $f'$ of the standard X.

On the foot-board Q is mounted the seat R; and to the inner side of the gear-block $D''$ is fastened the standard $l$. To this standard is pivoted a chain-wheel carrying a lever, and directly under the chain-wheel is pivoted a weighted dog, which takes into notches in the periphery of the chain-wheel. On the front end of the dog is a rod, $o$, by which the operator can with his foot release the dog from the notch at pleasure. To the chain-wheel one end of a chain, $p$, is fastened, the other end being fastened to the standard $h$ on the main frame A. The operator, by seizing the lever 1 of the chain-wheel, can wind the chain $p$ on the wheel, drawing the standard $h$ nearer to the chain-wheel, thereby raising the rear of the main frame A, and with it the inner end of the cutting apparatus connected to it, the outer end being raised by the operation of the transverse lever V, in the manner previously described.

The triangular frame being connected to the main frame by pivot-bolts, removable at pleasure, and the lifting device being connected to main frame by a hook, it is obvious that the triangular frame may be detached at pleasure, and it is also obvious that the longitudinal lever U, fastened at its forward end to ears on the gear-block D'' and connected by its long loop at its other end to the transverse lever V, will serve the same purpose in raising the outer end of the cutting apparatus as the triangular frame D' does.

In order to connect the platform to the main frame and cutting apparatus, the shoe G'' is first provided, having a flange, $n''$, at its lower edge, back of the recess for the reception of the end of the finger-bar S. To this flange is firmly fastened one end of the supporting-bar H'. The other or inner end is fastened securely to the flange $o''$ of the sheave-stand I', which is in turn securely fastened to the shoe T by a flange, $p''$, and by the pivot-bolts $a'$ of the hinge-piece. The supporting-bar H' has bed-pieces fastened to it for supporting the platform. The outside gathering-board is supported by the shoe G''.

On the outside of the rear end of the shoe G'' are two ears, $q''$, furnished with holes for inserting a pivot-bolt, $r''$, through them and through the caster-shank K', which has a series of holes, $s''$, for bolting the axle that carries the wheel L', which by the series of holes can be adjusted to different heights.

To support and drive the reel a sheave-stand, I', is connected to the shoe T and supporting-bar H', as previously described, and on that side of the sheave-stand next the main frame is pivoted the two sheaves $t''$ $u''$, and to the opposite side is bolted the reel-post M, on which is placed the reel-bearer N', having a recess for receiving the post and a cam-lever, $v''$, for fastening it at any height. The bearer N' has two boxes or bearings, $a'''$, for the reel-shaft O', on which the reel is fastened by frogs $b'''$. To the inner end of the shaft O' is fastened the sheave P'. The outer end of the reel-shaft has a bearing, $c'''$, fitted to the arm Q' by a loop, $d'''$, so as to slide freely on the arm. This arm or reel-post Q is pivoted at its rear end to a standard, R', which has a slotted arc, $e'''$, to which the arm Q is gripped by a bolt, $f'''$, when the reel is adjusted at the desired height.

To the hub or axle of the inner driving-wheel is fastened the sheave S', on which is placed the band T', the upper strand of which is placed under the sheave $u''$ on the sheave-stand I, and the lower stand is placed under the sheave $t''$ and both over the sheave P', forming an endless band.

The sheaves $t''$ and $u''$ being located near the hinged and pivoted connection of the cutting apparatus with the main frame, it will readily be seen that the band at the point where it passes over them will be but little affected by any of the positions that the cutting apparatus may assume, and the cutting apparatus may be changed in the vertical angle of its cut at pleasure by means of the graduating-lever W, while at the same time it may be raised or lowered for changing its height without interfering with the reel or band. The driving sheave S' has its point of rotation and the main frame A has its point of oscillation in the main axle C.

This machine, as shown in the drawings, is fitted up for cutting grain, but by removing the reel and platform and placing the driver in the rear seat of the pair is ready for mowing grass.

Having thus fully described the nature and object of this part of my invention, what I claim under this application is—

1. The combination of the triangular frame with the main frame, substantially as set forth, with a seat and lifting device mounted thereon, so that by the arrangement of the transverse lever with the triangular frame and cutting apparatus the driver can, when in his seat, raise the cutting apparatus from the ground at pleasure, substantially as described.

2. The combination and arrangement of the triangular frame with the main frame, transverse lever, and cutting apparatus, so that the cutting apparatus, when divested of the reel and platform, may be folded up and fastened without removing any part of the machine, substantially as described.

3. The combination and arrangement of the two seats and the two lifting devices with the other parts of the mechanism with which they act, so that the operator can, when occupying either seat on the machine, raise the cutting apparatus at pleasure, substantially as described.

4. The triangular frame, carrying the seat and lifting devices, so arranged and connected to the main frame that it, with the seat and lifting devices mounted thereon, can be detached from the main frame at pleasure without interfering with the organism of the machine or its effectiveness as a mower, substantially as described.

C. WHEELER, JR.

Witnesses:
A. B. STOUGHTON,
HAVER. FENDRICH.